Aug. 8, 1967     J. W. BOZEK     3,334,748
VARIABLE CAPACITY FILTER DEVICES
Filed April 29, 1965     2 Sheets-Sheet 1

INVENTOR
JOHN W. BOZEK

BY
ATTORNEY 3,334,748
VARIABLE CAPACITY FILTER DEVICES
John W. Bozek, Waterford, Mich., assignor to The Rosaen Filter Company, Hazel Park, Mich., a corporation of Michigan
Filed Apr. 29, 1965, Ser. No. 451,760
11 Claims. (Cl. 210—132)

ABSTRACT OF THE DISCLOSURE

A filter device including a filter element, means for closing off portions of the filter element to prevent fluid flow therethrough and pressure responsive means for opening fluid flow through larger portions of the filter element as the pressure differential across the element increases.

---

The present invention relates to fluid systems and more particularly to an improved filter device for such systems including means automatically operable to vary the filtration area afforded by the filter element of such devices in accordance with the flow rate through the filter device.

Heretofore filter devices and filter elements have been designed to provide the proper filtration area for a certain predetermined maximum flow rate through the filter device. When the flow rate is less than the maximum, the linear velocity of the fluid through the filter element and the pressure drop across the filter element are not sufficiently high to prevent air entrained in the fluid from collecting on the surface of the filter element. The air tends to collect in the form of small air bubbles and to coalesce into large bubbles. The collection of large air bubbles on the surface of the filter element effectively reduces the filtration area of the element so that if the flow rate is subsequently increased the filter element will be unable to meet the increased flow of fluid. Further, if the flow rate increases sufficiently to force the large bubbles through the filter element the air will form large pockets entrained in the fluid system where they can cause interference with efficient operation of the system.

The present invention provides a filter device including a variable capacity filter element and means for varying the filtration area of the filter element as the flow rate through the filter element or the pressure drop across the filter element changes. This insures that the pressure drop across the active area of the element and the linear velocity of the fluid passing through the element will be maintained at a sufficiently high value to carry the small bubbles entrained in the fluid through the filter element before they have a chance to accumulate and coalesce into large bubbles or pockets of air.

It is an object then of the present invention to prevent the accumulation of air bubbles in fluid systems by providing a filter device for such systems having means operable to vary the filtration area of the filter element in accordance with changes in the flow rate through the system.

It is another object of the present invention to improve fluid systems by providing a filter device having means responding to changes in the pressure differential across the filter element of the device to vary the filtration area of the element.

It is still another object of the present invention to improve filter devices for fluid systems by providing a variable capacity filter element for such devices and pressure responsive means actuated in response to changes in the pressure differential across the filter element to vary the filtration area of the element.

Figures 1, 2:
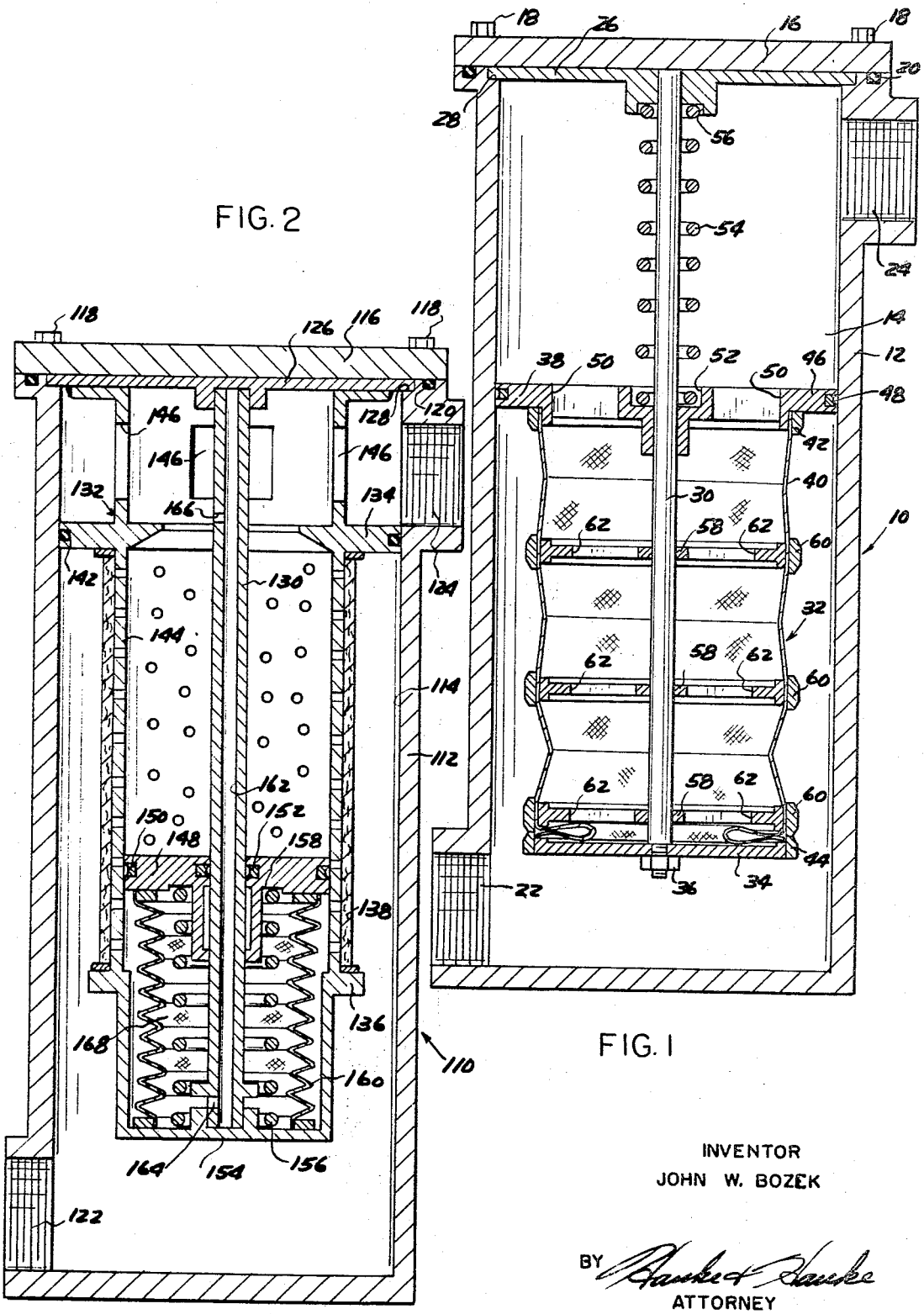
Figure 3:
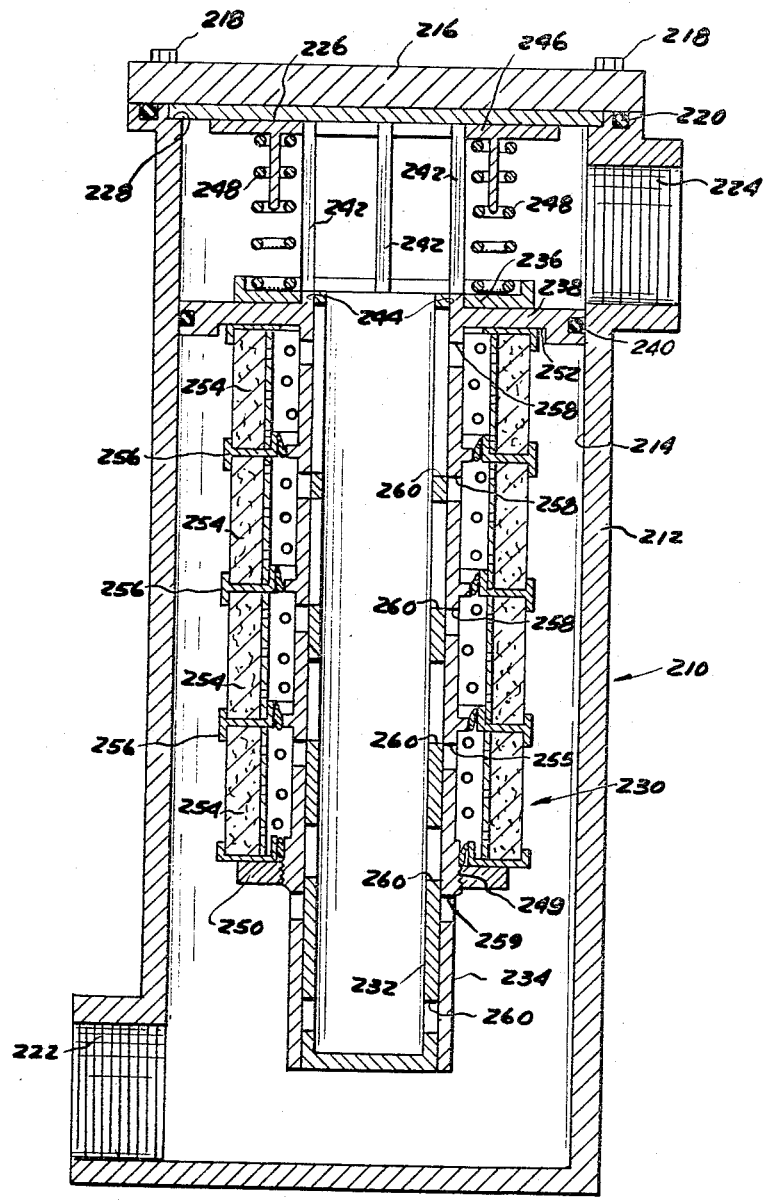

Still further objects and advantages of the present invention will readily occur to one skilled in the art to which the invention pertains upon reference to the following drawings in which like reference characters refer to like parts throughout the several views and in which FIG. 1 is a longitudinal cross-sectional view of one preferred filter device of the present invention, FIG. 2 is a longitudinal cross-sectional view of another preferred filter device of the present invention, and FIG. 3 is a longitudinal cross-sectional view of still another preferred filter device of the present invention.

Now referring to the drawings for a more detailed description of the present invention, FIG. 1 illustrates one preferred filter device 10 of the present invention as comprising a substantially cylindrical housing 12 forming a fluid filtering chamber 14. The chamber 14 is closed at one end by an end cap 16 secured to the housing member 12 by any convenient means such as screws 18. An O-ring seal 20 carried by the housing member 12 prevents fluid leakage past the end cap 16. An inlet 22 and an outlet 24 are provided in the housing member 12 in communication with the filter chamber 14.

An annular mounting member 26 is carried in a recess 28 provided in the housing member 12 and is retained in position by the end cap 16. The mounting member 26 carries a rod 30 extending axially into the filter chamber 14. A filter assembly generally indicated at 32 comprises a closure disc 34 fixed to the end of the rod 30 by a nut 36 and a pressure responsive disc member 38 is axially slidably mounted on the rod 30. A substantially cylindrical filter element 40 constructed of a flexible porous material has its upper edge fixed to the disc 38 by a mounting ring 42 and its lower edge fixed to the closure plate 34 by a similar mounting ring 44. This disc 38 is provided with an annular flange portion 46 extending radially outwardly from the filter element 40 and axially slidably engaging the inner wall of the housing member 12. A piston ring 48 is carried by the flange portion 46 and engages the inner wall of the housing member 12 so that the disc 38 separates the filter chamber 14 into two compartments, one in communication with the inlet 22 and one in communication with the outlet 24. The disc 38 is provided with a plurality of annularly spaced ports 50 which provide communication between the interior of the filter element 40 and the outlet 24.

The disc 38 is further provided with an annular recessed portion 52 which provides the seat for one end of the spring member 54. The other end of the spring member 54 is seated in a recess 56 formed in the mounting member 26 so that the spring member 54 urges the disc 38 axially along the rod 30 and the inner wall of the housing member 12 toward the closure plate 34.

A plurality of circular partition members 58 are axially slidably mounted on the rod 30 interiorly of the filter element 40. The outer peripheral edge of each of the partition members 58 is fixed to the filter element 40 by means of retaining rings 60 similar in construction to the rings 42 and 44. The rings 60 mount the partition members 58 in axially spaced positions along the inner surface of the filter element 40. Each of the partition members 58 is provided with a plurality of annularly spaced through ports 62.

It is apparent that the filter device 10 is illustrated in FIG. 1 is operable to change the filtration area of the element 40 in accordance with changes in the pressure differential across the flange portion 46 of the disc 38. Because one side of the flange portion 46 is subjected to pressure from the inlet side of the filter element 40 and the other side of the flange portion 46 is subjected to pressure on the outlet side of the filter element 40, the disc 38 will be moved axially along the rod 30 and the inner wall of the housing member 12 in response to changes in the pressure differential across the element 40. Because the pressure differential across the element 40 is a function of the flow rate through the filter device 10 the movement of the disc 38 will also vary in response to changes in the flow rate through the filter device 10.

Assuming that the flow rate through the filter device 10 is less than maximum the disc 38 will be urged by the spring member 54 axially toward a position in which one or more of the partition members 58 is disposed axially adjacent the closure plate 34. In this partially collapsed position of the filter element 40 that portion of the filter element 40 disposed on the closure plate will be less than the maximum area available for filtration. As the flow rate is increased through the inlet 22 a corresponding pressure differential increase will be produced across the flange portion 46. This increase of the pressure differential will cause the disc 38 to be moved axially upwardly against the force of the spring 54 thus moving the partition members 58 through their connections with the filter element 40 axially upwardly along the rod 30. This movement of the partition members 58 and the element 40 brings back into use at least a portion of the filtering element 40 which had been heretofore in a collapsed position.

Thus with a proper selection of the spring member 54 the effective filtering area of the filter element 40 can be varied to provide the proper filtration area at each flow rate through the device 10. As heretofore pointed out such a correspondence between the flow rate and the filtration area prevents the accumulation of air bubbles along the inlet surface of the filter element 40 and prevents the problems produced by such an accumulation of air bubbles.

It is to be further noted that the filter device 10 illustrated in FIG. 1 is also operable to increase the filtering area of the filter element 40 in accordance with changes in the pressure differential across the filter element which may be produced by clogging the filter element 40. Thus, assuming a constant flow rate through the filter device 10, as the element 40 begins to clog an increased pressure differential will be produced across the flange poortion 46 which will cause the disc 38 to be moved upwardly against the spring member 54 thus increasing the effective area of the filter element 40 and bringing into operation clean areas of the filter element 40.

FIG. 2 illustrates another preferred filter device 110 of the present invention as comprising a substantially cylindrical housing member 112 defining a filter chamber 114 closed at one end by an end cap 116. The end cap 116 is preferably secured to the housing member 112 by a plurality of screws 118. An O-ring seal 120 carried by the housing member 112 prevents fluid leakage past the end cap 116. The mounting member 126 provides the means for carrying a rod member 130 which extends axially into the filter chamber 114 and a cylindrical inner housing member 132 encompassing the rod 130.

The inner housing member 132 is provided with axially spaced radially outwardly extending flange portions 134 and 136 which provide the means for carrying a substantially cylindrical filter element 138. The flange 134 engages the inner wall of housing member 112 and carries an O-ring seal 142 so that fluid is prevented from passing from the inlet 122 past the flange 134 to the outlet 124.

The filter element 138 encompasses a perforated portion 144 of the inner housing member 132 and a plurality of annularly spaced outlet ports 146 are provided in the inner housing member 132 adjacent the outlet 124 so that fluid can pass through the filter element 138, the perforated portion 144 and the ports 146 to the outlet 124.

A piston member 148 is axially slidably mounted on the rod 130 and is provided with a piston ring 150 at its outer peripheral edge which engages the inner surface of the portion 144. A piston ring 152 is also provided on the piston member 148 to engage the rod 130. The lower end of the inner housing member 132 is closed by a plate portion 154 and a spring member 156 is disposed intermediate the plate portion 154 and a suitable annular recess 158 provided in the piston member 148 so that the piston member 148 is urged axially upwardly along the rod member 130 and the inner surface of the portion 144. A flexible non-porous member 160 has its lower edge fixed to the inner surface of the plate portion 154 and its upper edge fixed to the piston member 148. The rod 130 is provided with an axial passage 162 and radial passages 164 and 166 disposed to provide communication between an area on the outlet side of the filter element 138 adjacent the outlet 124 and the chamber 168 formed intermediate the piston member 148 and the plate portion 154.

It is apparent that the axial position of the piston member 148 will determine the effective filtration area of the filter element 138. Fluid can only reach the outlet 124 through the portion of the filter element 138 which is disposed above the piston member 148 so that by varying the position of the piston member 148 the filtration area of the filter element 138 can be varied. In the position of the piston member 148 illustrated in FIG. 2, the flow rate through the filter device 110 is somewhat less than maximum. Upon an increase in the flow rate the increased fluid flow past the radial passage 166 will produce a siphoning effect which will cause fluid to flow from the chamber 168 through the axial passage 162 and out the passage 166. The reduced pressure in the chamber 168 then will produce a pressure differential across the piston 148 which will cause the piston member 148 to be moved downwardly against the force of the spring 156 to thereby increase that portion of the filter element 138 above the piston member 148 and to increase the effective filtration area of the filter element 138. Similarly a decrease in the flow rate past the radial passage 166 will in effect cause an increased pressure in the chamber 168 which in combination with the spring member 156 will urge the piston member 148 upwardly along the rod 130 to a position reducing the effective filtration area of the filter element 138. With a proper selection of the spring member 156 a proper correspondence between the filtration area provided by the filter element 138 at any given flow rate can be achieved.

FIG. 3 illustrates another preferred filter device 210 of the present invention as comprising a substantially cylindrical filter housing 212 defining a filter chamber 214. One end of the filter chamber 214 is closed by an end cap 216 secured to the housing member 212 by screws 218. An O-ring seal 220 is carried by the housing member 212 to prevent fluid leakage past the end cap 216. An inlet 222 and an outlet 224 are provided in the housing member 212 communicating with the filter chamber 214.

A mounting member 226 is carried in a suitable annular recess 228 provided in the housing member 212 and is retained in position by the end cap 216. The mounting member 228 provides the means for positioning a filter assembly 230 within the filter chamber 214.

The filter assembly 230 preferably comprises an inner tubular member 232 and an outer tubular member 234. The inner tubular member 232 is preferably closed at its lower end and is provided at the opposite end with a radially outwardly extending flange portion 236 overlying a radially outwardly extending flange 238 provided on the outer tubular member 234. The flange portion 238 engages the inner wall of the housing member 212 defining the filter chamber 214 and an O-ring seal 240 is provided on the outer peripheral edge of the flange portion 238 to prevent fluid leakage past the flange portion 238. The outer tubular member 234 is carried in a fixed position by a plurality of axially extending annularly spaced struts 242 which connect the upper edge of the outer tubular member 234 to the mounting member 226. The flange portion 236 of the inner tubular member 232 is provided with a plurality of annularly spaced through openings 244 which axially slidably receive the struts 242 so that the inner tubular member 232 is axially slidably movable along the inner surface of the outer tubular member 234 and along the struts 242.

A spring seat member 246 is secured to the mounting member 226 and provides the seat for a plurality of annularly spaced spring members 248 which engage the flange portion 236 of the inner tubular member 232 and urge the flange 236 axially downwardly into engagement with the flange portion 238 of the outer member 234.

A portion 249 of the outer surface of the outer tubular member 234 is threaded as shown to receive a nut member 250. The nut member 250 and an annular recess 252 provided in the flange portion 238 provide the means for carrying a plurality of cylindrical filter elements 254 separated from one another by annular retaining rings 256.

The outer tubular member 234 is provided with a plurality of sets of annularly spaced ports 258. The sets of ports 258 are in turn each substantially equally axially spaced along the length of the outer tubular member 234 with each set of annularly spaced ports 258 registering with one of the filter elements 254. A set of bypass ports 259 is provided in the outer tubular member 234 below the filter elements 254. The inner tubular member 232 is provided with a plurality of sets of annularly spaced ports 260. The sets of ports 260 are likewise spaced axially along the length of the tubular member 232 but vary in axial length in a decreasing manner from the upper end of the tubular member 232 to the lower end of the tubular member 232 as shown.

With the tubular member 232 in the axial position illustrated in FIG. 3, fluid enters the inlet 222 and flows radially inwardly through the uppermost filter element 254 through the corresponding ports 258 of the tubular member 234 and the registering ports 260 of the tubular member 232 and through the outlet 224. As the flow rate increases through the filter device 210 a pressure differential is produced across the lower end of the inner tubular member 232 since the interior portion of the tubular member 232 is subjected to pressure on the outlet side of the filter elements 254 and the outer end of the tubular member 232 is subjected to pressure on the inlet side of the filter elements 254. This increased pressure differential causes the tubular member 232 to be moved axially upwardly within the fixed tubular member 234 and against the force of the spring members 248. As the inner tubular member 232 begins to move axially upwardly the ports 260 will be moved into registry with the ports 258 provided on the outer tubular member 234 in sequence to open flow through the filter elements 254 in sequence from top to bottom.

Assuming less than maximum flow rate through the filter device 210 the inner tubular member 232 will assume a position intermediate its permitted lowermost and its permitted uppermost position. The position which it assumes will depend upon the pressure differential existing across the lowermost portion of the tubular member 232 as well as the force of the springs 248. Thus, by a proper selection of the springs 248 it will be possible to produce a movement of the tubular member 232 to a position in which the proper number of filter elements 254 are opened to filtration at any given flow rate. The lowermost ports 260 and ports 259 provide a bypass path which opens at a predetermined pressure differential across the filter elements 254.

It is to be noted that like the embodiment of FIG. 1 the embodiment of FIG. 3 also acts to increase the effective filtration area of the filter element 230 upon a change in the clogged condition of that portion of the filter element being used at any given flow rate. For instance, if the inner tubular member 232 is in the position as illustrated in FIG. 3 and the uppermost filter element 254 begins to become clogged the resulting pressure differential increase produced across the lowermost portion of the tubular member 232 will cause the tubular member 232 to move axially upwardly to open the next filter element 254 for use.

It is apparent that filter devices have been disclosed in which means are provided for variably increasing the filtration area of the filter element in accordance with either the flow rate through the filter device or the pressure differential change across the filter element. This provides filter devices in which entering air is prevented from accumulating on the inlet side of the filter element and sufficient velocity and pressure drop is maintained regardless of the flow rate to insure that entrained air will be forced through the filter element during operation of the system. Further, in the devices illustrated a convenient means for increasing the filtration area in accordance with an increased clogging of the filter element has been provided.

It is also apparent that although I have described but several embodiments of my invention many changes and modifications can be made therein without departing from the spirit of the invention as expressed by the appended claims.

I claim:
1. A filter device comprising:
 (a) a housing member defining a filter chamber and having an inlet and an outlet open to said filter chamber,
 (b) a filter element having an axis and carried in said filter chamber intermediate said inlet and said outlet,
 (c) means movable within said filter chamber on an axis paralllel to the axis of said filter element intermediate a first position substantially blocking fluid flow through said filter element and a second position opening fluid flow through said filter element,
 (d) said last mentioned means constructed to open fluid flow through increasing axial lengths of said filter element intermediate said first and said second position,
 (e) resilient means urging said blocking means toward said first position, and
 (f) pressure responsive means urging said blocking means toward said second position upon increases in the flow rate through said filter device.
2. The filter device as defined in claim 1 and in which:
 (a) said filter element is flexible and said blocking means comprises a plurality of ring members carried at axially spaced positions along the length of said flexible filter element,
 (b) said pressure responsive means is actuated in response to a decrease in the pressure differential across said filter element to move said ring members toward an adjacent position in which said filter element is collapsed and actuated in response to an increase in the pressure differential across said filter element to move said ring members toward a separated position to expand said filter element whereby said collapsed position corresponds to the first position of said blocking means and the expanded position of said filter element corresponds to the second position of said blocking means.
3. A filter device as defined in claim 1 and in which:
 (a) said filter element comprises a plurality of cylindrical, axially aligned filtering members,
 (b) said blocking means comprises a valve member operable to move from a position closing fluid flow through all but one of said filtering members to positions in which said fluid flow is opened through the remaining said filtering members in sequence,
 (c) said pressure responsive means moving said valve member in response to changes in the pressure differential across the filter element.
4. The filter device as defined in claim 1 and in which said last mentioned means comprises a movably mounted piston member having one surface subjected to pressure on the inlet side of said filter element and the other surface subjected to pressure on the outlet side of said filter element and means connecting said pressure responsive means and said blocking means.

5. The filter device as defined in claim 1 and in which:
(a) said filter element is flexible and is movable by said pressure responsive means intermediate an expanded and a collapsed position,
(b) said pressure responsive means is actuated in response to an increase in the pressure differential across said filter element to move said blocking means toward said second position and to thereby move said filter element toward said expanded position.

6. The filter device as defined in claim 1 and in which:
(a) said filter element is cylindrical and has the exterior thereof exposed to said inlet and the interior thereof exposed to said outlet,
(b) said pressure responsive means comprising a piston member axially slidably mounted within said filter element and forming therein a first chamber connected with said outlet and a second chamber blocked from said outlet by said piston member,
(c) said piston member moving axially within said filter element in response to changes in the flow rate through said filter device.

7. A filter device comprising
(a) a substantially cylindrical housing member defining a filter chamber and having an inlet and an outlet open to said filter chamber,
(b) a hollow cylindrical filter element carried in said filter chamber intermediate said inlet and said outlet,
(c) pressure responsive means carried in said housing member and movable axially therein in response to changes in the pressure differential across said filter element, and
(d) means actuated by said pressure responsive means and operable to move axially with said pressure responsive means to close fluid flow through a portion of the axial length of said filter element upon the pressure differential across said element decreasing to a predetermined value.

8. The device as defined in claim 1 and including,
(a) said filter element being flexible and having one edge fixedly mounted in said filter chamber and the other edge fixed to said pressure responsive means, and
(b) means urging said pressure responsive means toward said fixed edge of said filter element whereby said filter element will be moved to a collapsed position.

9. The filter device as defined in claim 7 and in which said last mentioned means comprises valve means actuated by said pressure responsive means to move to axial positions to open and close fluid flow through axial portions of said filter element.

10. The device as defined in claim 7 and in which said last mentioned means comprises:
(a) said filter element being flexible and having one edge fixedly mounted in said filter chamber and the other edge fixed to said pressure responsive means,
(b) a plurality of ring members fixed at axially spaced points to said flexible filter member, and
(c) means urging said pressure responsive means toward said fixed edge of said filter element so that said ring members will be moved successively to a position adjacent the next ring member and collapse portions of said filter element upon decreasing pressure differentials across said filter element.

11. A filter device as defined in claim 7 and including, said pressure responsive means being movably carried within said filter element intermediate a position opening fluid flow through said filter element and a position blocking fluid flow through at least a portion of said filter element.

References Cited

UNITED STATES PATENTS

| | | | |
|---|---|---|---|
| 1,696,313 | 12/1928 | Liddell | 210—356 |
| 2,079,365 | 5/1937 | Thomas | 210—97 |
| 2,134,061 | 10/1938 | Thomas | 210—109 |
| 2,460,084 | 1/1949 | Hebo | 210—356 |
| 2,692,686 | 10/1954 | Fleck et al. | 210—97 |
| 3,184,064 | 5/1965 | Sampson et al. | 210—136 |
| 3,216,572 | 11/1965 | Kasten | 210—97 |
| 3,268,077 | 8/1966 | Ball | 210—131 |

REUBEN FRIEDMAN, *Primary Examiner.*

W. S. BRADBURY, *Assistant Examiner.*